(12) United States Patent
Tamakoshi et al.

(10) Patent No.: US 8,084,153 B2
(45) Date of Patent: Dec. 27, 2011

(54) OPERATIONAL GUIDANCE DEVICE OF SODIUM-SULPHUR BATTERY

(75) Inventors: Tomio Tamakoshi, Kasugai (JP); Sunao Atsumi, Nisshin (JP)

(73) Assignee: NGK Insulators, Ltd., Nagoya (JP)

( * ) Notice: Subject to any disclaimer, the term of this patent is extended or adjusted under 35 U.S.C. 154(b) by 940 days.

(21) Appl. No.: 12/034,009

(22) Filed: Feb. 20, 2008

(65) Prior Publication Data

US 2008/0206626 A1   Aug. 28, 2008

(30) Foreign Application Priority Data

Feb. 23, 2007   (JP) ................. 2007-044519

(51) Int. Cl.
  *H01M 10/39*   (2006.01)
  *H01M 10/48*   (2006.01)
  *G01R 31/36*   (2006.01)
(52) U.S. Cl. ............... 429/61; 429/50; 429/62; 429/104
(58) Field of Classification Search ............... 429/61, 429/50, 62, 104
See application file for complete search history.

(56) References Cited

U.S. PATENT DOCUMENTS 6,958,197 B2   10/2005   Tamakoshi

FOREIGN PATENT DOCUMENTS

| JP | 08-050930 A1 | 2/1996 |
| JP | 2000-182662 A1 | 6/2000 |
| JP | 2003-288950 A1 | 10/2003 |
| WO | WO 9843310 A1 * | 10/1998 |

* cited by examiner

*Primary Examiner* — Gregg Cantelmo
(74) *Attorney, Agent, or Firm* — Burr & Brown

(57) ABSTRACT

An operation guidance program of a sodium-sulphur battery includes a unit that input an operation output and a time zone, a unit that continuously inputs the remaining battery capacity and the battery temperature, a unit that predicts the remaining battery capacity of the sodium-sulphur battery and the battery temperature of the sodium-sulphur battery at the final time, a unit that compares the predicted remaining battery capacity with a standard smallest capacity recorded in advance and outputs guidance when the remaining battery capacity is smaller, and a unit that compares the predicted battery temperature with a standard highest temperature recorded in advance and outputs guidance when the battery temperature is higher than the standard highest temperature.

4 Claims, 4 Drawing Sheets

OPERATIONAL GUIDANCE DEVICE OF SODIUM-SULPHUR BATTERY

BACKGROUND OF THE INVENTION

1. Field of the Invention

The present invention relates to a guidance apparatus for operating a sodium-sulphur battery. In particular, the present invention relates to a guidance apparatus used to efficiently operate a sodium-sulphur battery that structures a hybrid system for supplying power with combination with a generator whose output changes, such as a wind turbine.

2. Description of the Related Art

As a main constituting unit of a battery energy storage system for leveling a power demand (load) or a backup power apparatus for natural disasters, a sodium-sulphur battery is put into practical use. The sodium-sulphur battery is a secondary battery in which molten metal sodium as a cathode active material and melt sulphur as an anode active material are arranged separately from each other using a $\beta$-alumina solid electrolyte having selective permeability toward sodium ions. In the sodium-sulphur battery, the molten metal sodium discharges electrons to be sodium ions, the sodium ions are permeated through a solid electrolyte and are moved to the anode side, sodium polysulfide is generated in reaction to electrons supplied from sulphur and an external circuit, and discharge operation is performed. On the contrary to the discharge operation, reaction to generate sodium and sulphur from sodium polysulfide enables charge operation (with respect to the sodium-sulphur battery, refer to, e.g., JP-A-2003-288950 and JP-A 2000-182662).

The following two points may be taken up as a major factor to be taken into consideration for operating the sodium-sulphur battery.

Firstly, the remaining energy (or discharge capacity) should be properly managed. In the sodium-sulphur battery, if sodium polysulfide is formed at the anode side and the concentration of sodium ion at the cathode side becomes short due to overdischarge, the charge/discharge operation after that becomes impossible. Further, if the solid electrolyte is damaged and the active substance leaks due to overdischarge, the charge/discharge operation thereafter becomes impossible. Thus, the charge can not be continued if the remaining energy exceeds the end of the charge which is detectable with a voltage, and, similarly, the discharge can not be continued if the capacity exceeds the end of the discharge. Thus, if the capacity suddenly reaches the end of charge or discharge, the above-mentioned apparatus can not function as a battery energy storage system (battery). Accordingly, it is recognized that the management of the remaining energy is quite important.

Secondly, the module temperature should be controlled within a predetermined range (about, 280 to 360° C.). Preferably, the sodium-sulphur battery is operated at a high temperature not less than 280° C. in order to efficiently perform the charge/discharge operation because of temperature characteristics of a sodium ion conductivity of the $\beta$-alumina solid electrolyte. On the other hand, various members constituting the battery have a limit in the thermal endurance, and the module temperature of the sodium-sulphur battery is thus limited. Therefore, it is important to operate the sodium-sulphur battery within the above-mentioned predetermined temperature range.

SUMMARY OF THE INVENTION

Meanwhile, the management of the remaining energy and the control of the module temperature are not necessarily easy. Conventionally, the sodium-sulphur battery cannot be efficiently operated (driven). In particular, there is a problem that, in the case that an operating manager is less in experience, the remaining energy runs short before the scheduled end time of power generation, or the continuous operation becomes impossible consequent on the rise in the module temperature beyond the upper limit thereof.

If the module temperature of the sodium-sulphur is to be out of a predetermined range of the battery, the operation must be stopped even when the capacity remains, and this might lead to the reduction in operation rate. Further, the rise in module temperature is caused by the Joule heat generation due to the internal resistance and reaction heat, internal resistance increases due to corrosion inside cell. Furthermore, as a result of module temperature rise, the internal resistance decreases, causes current increase in high temperature modules, and the temperature locally rises. Therefore, it is not easy for an operator to operate the sodium-sulphur battery within a predetermined temperature, taking those factors into consideration.

In addition, upon using the sodium-sulphur battery as a power compensating device of a generator of renewable energy such as wind energy, sunlight, and geothermal heat, the above-mentioned management and control is more difficult than that upon using the sodium-sulphur battery as means of the load leveling. For example, upon applying the sodium-sulphur battery to a battery energy storage system for leveling the load during day and night, the change in load during day and night is within a predetermined range in many cases. As a consequence, even if the operation (charge/discharge operation) of the sodium-sulphur battery on the leveling side is not easy, the remaining energy and the change in temperature are within a prescribed range of a well-experienced operation manager in many cases. However, the renewable energy changes every moment, and the generator of renewable energy necessarily thus changes the output thereof, and the amount of charge/discharge operation required for the sodium-sulphur battery for compensating for the change in output changes every moment. Consequently, the power storage system (battery) in the power compensating device is at high risk of not functioning without calculating the amount of charge/discharge operation available of the sodium-sulphur battery in real time and correcting an operation plan in accordance therewith. This can be the most difficult operation even for a well-experienced operation manager.

The present invention has been developed in view of such situations, and an object thereof is to provide means for efficiently operating a sodium-sulphur battery even by a less-experienced operation manager, with which it can be simulated how long the charge/discharge operation is possible by how much power upon operating the sodium-sulphur battery. As a result of long research, we have found that the following means can solve the above problems.

First of all, according to the present invention there is provided an operational guidance device of a sodium-sulphur battery that outputs guidance in operation of the sodium-sulphur battery. The operational guidance device comprises:

means that inputs an operation output (electrical power for operation) necessary for the sodium-sulphur battery and a time zone for requiring the operation output;

means that continuously inputs a remaining battery capacity of the sodium-sulphur battery and a battery temperature of the sodium-sulphur battery;

means that predicts the remaining battery capacity of the sodium-sulphur battery and the battery temperature of the sodium-sulphur battery at the final time of the time zone on the basis of the remaining battery capacity of the sodium-sulphur battery and the battery temperature of the sodium-sulphur battery, which are continuously input, the operation output necessary (required) for the sodium-sulphur battery, and the time zone for requiring the operation output; means that compares the predicted remaining battery capacity of the sodium-sulphur battery at the final time with a standard smallest capacity recorded in advance, and outputs guidance indicating a control target value of a battery output is to be changed because the capacity runs short when the remaining battery capacity is smaller than the standard smallest capacity; and means that compares the predicted battery temperature of the sodium-sulphur battery at the final time with a standard highest temperature recorded in advance and outputs guidance indicating that a control target value of a battery output is to be changed when the battery temperature is high because the discharge operation stops, with consequence that the temperature reaches an upper limit of an allowable range.

Further, according to the present invention, there is provided an operational guidance device of a sodium-sulphur battery of a hybrid system. The hybrid system supplies power to grid by combining a generator and a battery energy storage system. The operational guidance device and a PCS (Power Conversion System) form the battery energy storage system and the operational guidance device further outputs guidance in operation of the sodium-sulphur battery for compensating for an output of the generator. The operational guidance device comprises:

means that input, for every time zone, a planned and combined output of the hybrid system and a predicted output of the generator;

means that calculates an operation output (electrical power for operation) necessary (required) for the sodium-sulphur battery for every the time zone on the basis of the planned and combined output and the predicted output;

means that continuously inputs a remaining battery capacity of the sodium-sulphur battery and a battery temperature of the sodium-sulphur battery;

means that predicts the remaining battery capacity of the sodium-sulphur battery and the battery temperature of the sodium-sulphur battery at the final time of the time zone on the basis of the remaining battery capacity of the sodium-sulphur battery and the battery temperature of the sodium-sulphur battery, which are continuously input, the calculated operation output necessary for the sodium-sulphur battery, and the time zone for requiring the operation output;

means that compares the predicted remaining battery capacity of the sodium-sulphur battery at the final time with a standard smallest capacity recorded in advance and outputs guidance indicating that the planned and combined output is to be changed because the capacity runs short when the remaining battery capacity is smaller than the standard smallest capacity; and means that compares the predicted battery temperature of the sodium-sulphur battery at the final time with the standard highest temperature recorded in advance and outputs guidance indicating that the planned and combined output is to be changed when the battery temperature is high because the discharge operation stops, with consequence that the temperature reaches an upper limit of an allowable range.

The operational guidance device of the sodium-sulphur battery of the hybrid system according to the present invention is preferably used when the generator forming the hybrid system is a generator whose output is easily changed, specifically, when the generator is a generator of renewable energy using at least one of wind energy, sunlight, and geothermal heat.

The operational guidance device of the sodium-sulphur battery of the hybrid system according to the present invention is similar to the operational guidance device of the sodium-sulphur battery according to the present invention, except for the following points. Differently, first of all, it is specified that the sodium-sulphur battery forms the hybrid system. Secondly, an operation output (operation electrical power) necessary for the sodium-sulphur battery is not directly input, but a planned combined output of the hybrid system and a predicted output of the generator are input and an operation output is calculated based on the input result. Finally, if the capacity runs short or the temperature reaches an allowable upper limit, the apparatus does not output a guidance for changing a target value of a battery output control of the sodium-sulphur battery, but output a guidance for changing the planned combining output of the hybrid system. Incidentally, the predicted output of the generator can be calculated by wind speed assumed based on weather information.

With respect to inputs of the remaining battery capacity and the battery temperature, the term "continuously" includes both "intermittently" and "successionally". Preferably, "continuously" means "successionally". In the specification, the remaining battery capacity is simply expressed as the remaining energy. Further, the operation means driving, specifically, charge/discharge operation.

An operation output necessary for the sodium-sulphur battery and a time zone for requiring the operation output mean an operation output (operation electrical power) required in the future after one time point and a time zone for requiring the operation output. The remaining battery capacity and the battery temperature of the sodium-sulphur battery are continuously input until the one time point. Herein, the one time point usually means that the time when the sodium-sulphur battery is operated, i.e., the current time. However, the present invention is not limited to this and one time point may be another time point in the past or in the future. In other words, in the operational guidance device of the sodium-sulphur battery according to the present invention, the simulation after the current time is possible. In addition, in the device according to the present invention, it is possible to simulate the operation of the sodium-sulphur battery based on one assumption irrespective of the current situation and to examine the past operation.

One may input the required operation output and/or the time zones for requiring the operation out as one set, or plural sets. In other words, the operation output required by the sodium-sulphur battery is input for every time zone. If inputting the operation output for every time zone until the end time of the operation of the sodium-sulphur battery, with the operational guidance device of the sodium-sulphur battery of the hybrid system, it is possible to predict whether or not the sodium-sulphur battery is operated after one time point (usually, the current time) without causing a problem of the sodium-sulphur battery.

Furthermore, according to the present invention, there is provided an operation guidance program of a sodium-sulphur battery that enables a computer, so as to output guidance in operation of the sodium-sulphur battery, to function as:

means that inputs an operation output necessary for the sodium-sulphur battery and a time zone for requiring the operation output;

means that continuously inputs a remaining battery capacity of the sodium-sulphur battery and a battery temperature of the sodium-sulphur battery;

means that predicts the remaining battery capacity of the sodium-sulphur battery, and the battery temperature of the sodium-sulphur battery at the final time of the time zone on the basis of the remaining battery capacity of the sodium-sulphur battery and the battery temperature of the sodium-sulphur battery, which are continuously input, the operation output necessary (required) for the sodium-sulphur battery, and the time zone for requiring the operation output;

means that compares the predicted remaining battery capacity of the sodium-sulphur battery at the final time with a standard smallest capacity recorded in advance, and outputs guidance indicating that a control target value of a battery output is to be changed because the capacity runs short when the remaining battery capacity is smaller than the standard smallest capacity; and means that compares the predicted battery temperature of the sodium-sulphur battery at the final time with a standard highest temperature recorded in advance, and outputs guidance indicating that a control target value of a battery output is t to be changed when the battery temperature is high because the discharge operation stops, with consequence that the temperature reaches an upper limit of an allowable range.

In addition, according to the present invention, there is provided a control system of a sodium-sulphur battery comprising: the above-mentioned operational guidance device of the sodium-sulphur battery; a monitoring device comprising means that inputs guidance indicating that a control target value of a battery output from the operational guidance device is to be changed and outputs a new lower control target value of the battery output and means that outputs an operation outputs necessary (required) for the sodium-sulphur battery and a time zone for requiring the operation output to the operational guidance device; and a control device comprising means that inputs the new control target value of the battery output from the monitoring device and controls an output of the sodium-sulphur battery, and means that continuously outputs a remaining battery capacity of the sodium-sulphur battery and a battery temperature of the sodium-sulphur battery to the operational guidance device.

In the operational guidance device of the sodium-sulphur battery according to the present invention, e.g., it is possible to predict the remaining battery capacity and the battery temperature in the future on the basis of the remaining battery capacity and the battery temperature of sodium-sulphur battery until the current time and of the operation output for every time zone required in the future, and to output the prediction result and a guidance based thereon, thus even the less-experienced operation manager can efficiently and stably operate the sodium-sulphur battery. Accordingly, there hardly occur problems such shortage of the remaining energy prior to the scheduled end time of power generation and the failure to continue operation and to the rise of the module temperature beyond the upper limit, like the continued one.

In addition, since it is able to perform simulation of the operation of the sodium-sulphur battery based on one assumption and verify the past, an operation plan is drawn out and improved, a potential problem is predicted, and the arising problem is analyzed.

In general, for the load leveling, a changing pattern of the load is easily predicted. However, with the operational guidance device of the sodium-sulphur battery according to the present invention, when the load is changed out of the prediction, even the less-experienced operator can cope with the situation unwaveringly. That is, the operational guidance device of the sodium-sulphur battery according to the present invention is also advantageous upon using the sodium-sulphur battery as a main constituting unit of the battery energy storage system for the load leveling.

In addition, when the sodium-sulphur battery forms the hybrid system, i.e., when the operational guidance device of the sodium-sulphur battery according to the present invention corresponds to the operational guidance device of the sodium-sulphur battery of the hybrid system according to the present invention and is a generator of renewable energy in which an output of the generator is liable to change, the operational guidance device of the sodium-sulphur battery according to the present invention is more advantageous and valuable than that for the load leveling. The change in output of the generator of renewable energy means that both the amount of charge operation and the amount of discharge operation required for the sodium-sulphur battery that compensates for the change in output also change every moment, thus even a well-experienced operation manager cannot efficiently and stably operate the sodium-sulphur battery. Therefore, there is a possibility that the sodium-sulphur battery stops when the remaining energy of the sodium-sulphur battery is set to 0, or the module temperature is higher than the upper limit threreof. However, with the operational guidance device of the sodium-sulphur battery of the hybrid system according to the present invention, this problem can be prevented and preferable driving can be continued.

REFERENCE NUMERAL

Figure 1:
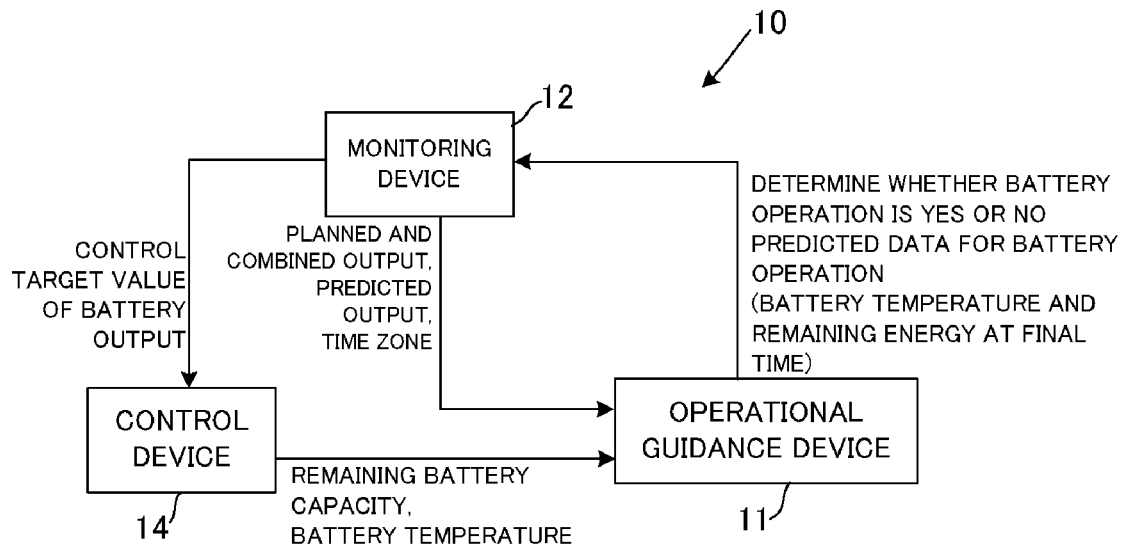
FIG. 1 is a diagram showing a structure of a control system of a sodium-sulphur battery including an operational guidance device of the sodium-sulphur battery according to an embodiment of the present invention.

1: Grid, 3: sodium-sulphur battery, 4: Power Conversion System, 5: Battery Energy Storage System, 7: wind turbines, 8: hybrid system, 9: transformer, 10: control system, 11: operational guidance device, 12: monitoring device, 14: control device, 41, 42, 43: wattmeter

DETAILED DESCRIPTION OF THE INVENTION

Embodiments of the present invention will hereinafter be described appropriately with reference to the drawings, but the present invention is not limited to these embodiments when interpreted. The present invention can variously be changed, modified, improved and replaced based on knowledge of a person skilled in the art without departing from the scope of the present invention. For example, the drawings show preferable embodiments of the present invention, but the present invention is not limited to configurations and information shown in the drawings. To implement or verify the present invention, means similar or equivalent to means described in the present description can be applied, but preferable means are the following means.

Figure 2:
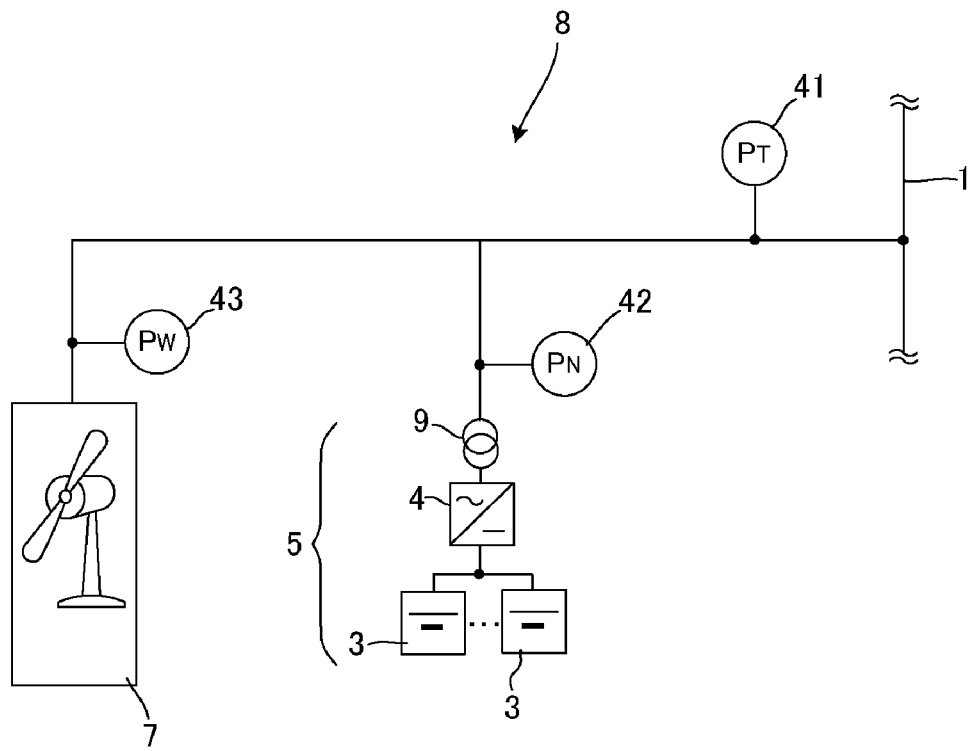
FIG. 2 is a diagram of a system structure showing an example of a hybrid system having a generator whose output changes and a battery energy storage system.
Figure 3:
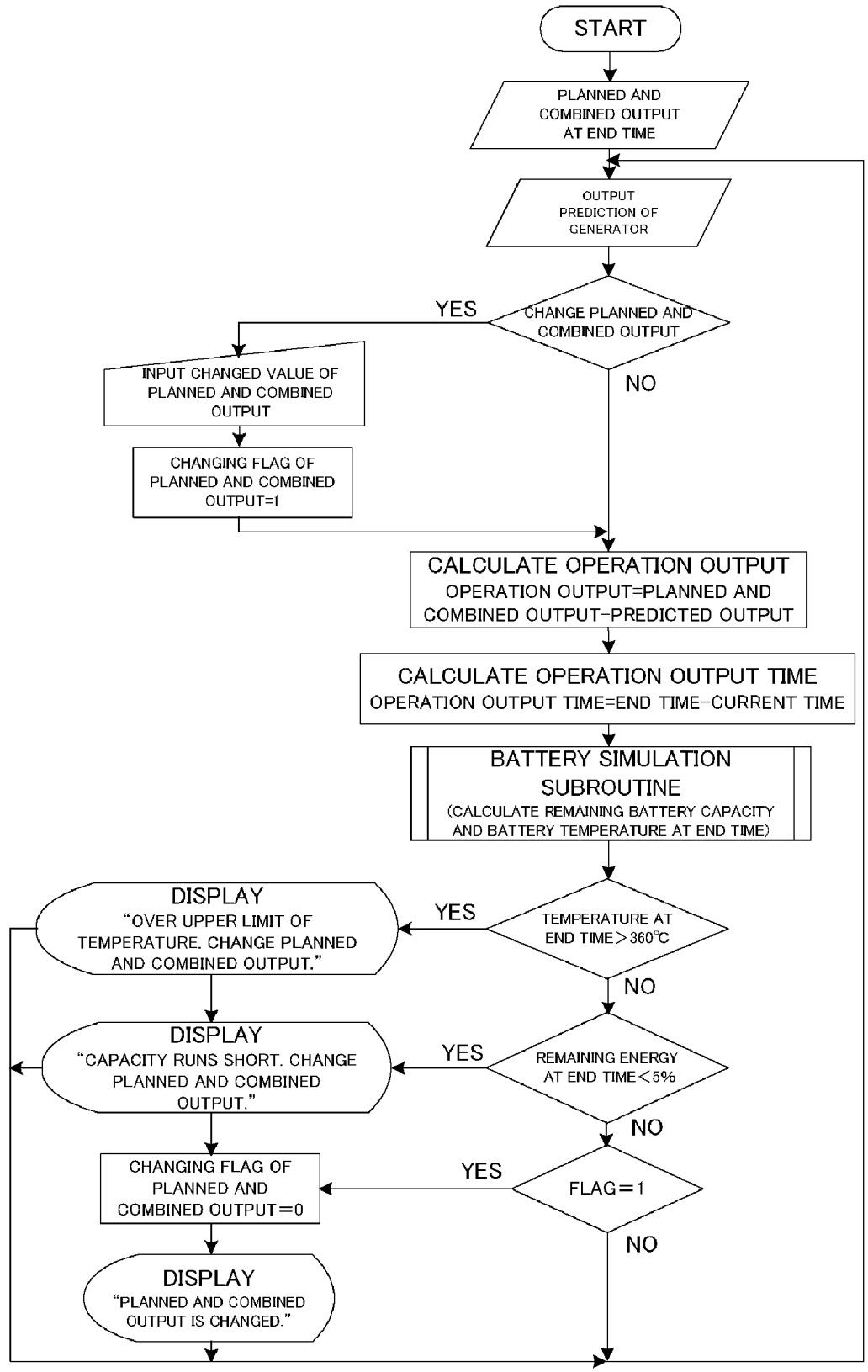
FIG. 3 is a flowchart showing an example of a processing flow of the operational guidance device of the control system of the sodium-sulphur battery shown in FIG. 1 according to the present invention.
Figure 4:
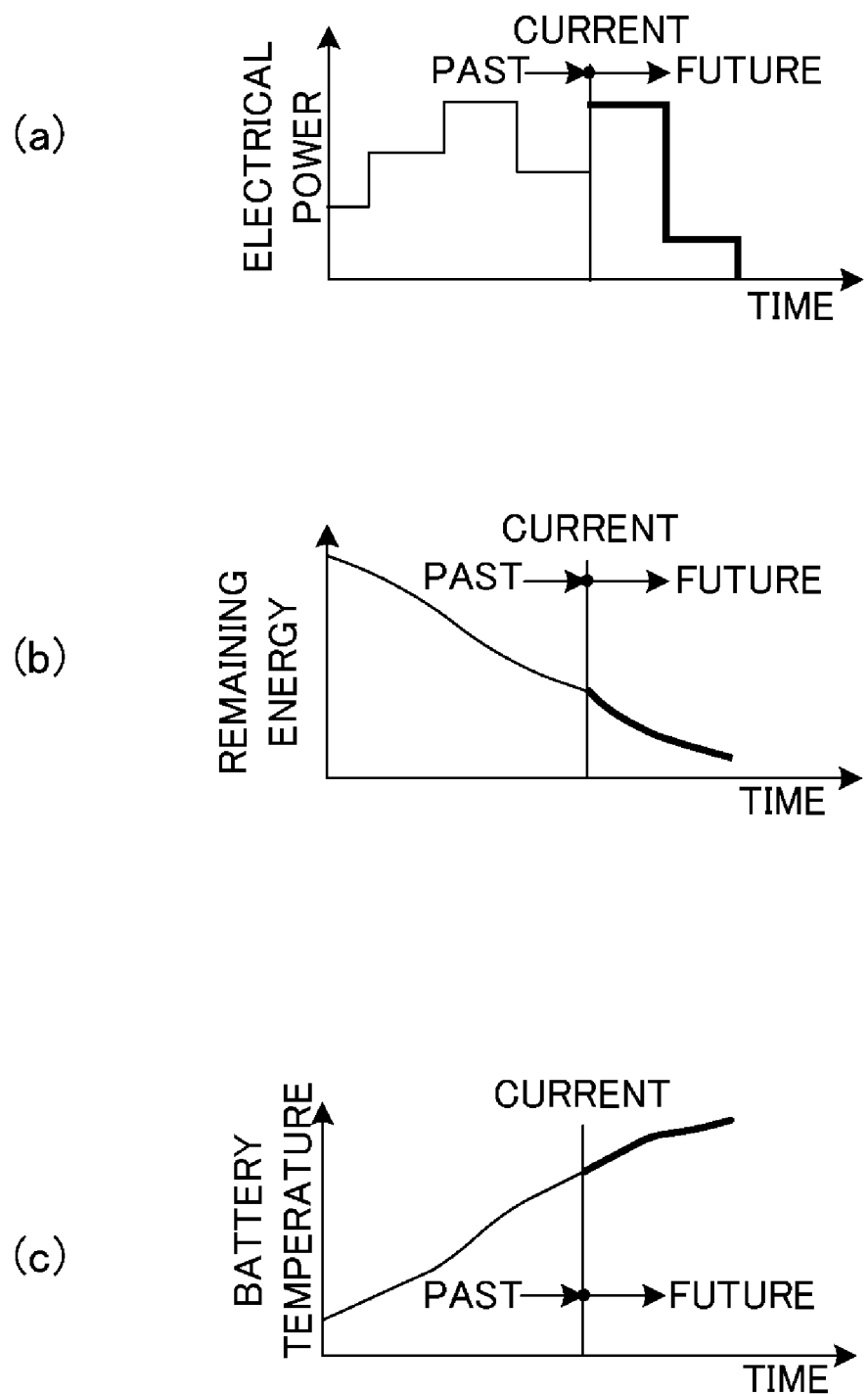
FIGS. 4(a) to 4(c) are graphs showing the electrical power, the remaining battery capacities, and the battery temperatures in the past, at the current time, and in the future of the sodium-sulphur battery in the hybrid system shown in FIG. 2.

FIG. 1 is a diagram showing a structure of a control system of a sodium-sulphur battery, including an operational guidance device of the sodium-sulphur battery according to the embodiment of the present invention. FIG. 2 is a diagram of a system structure showing an example of a hybrid system using the sodium-sulphur battery controlled by the control system shown in FIG. 1 as a main constituting unit of a battery energy storage system. FIG. 3 is a flowchart showing an example of a processing flow of the operational guidance device of the control system of the sodium-sulphur battery shown in FIG. 1 according to the present invention. Incidentally, the operational guidance device mainly comprises a sequencer and an industrial computer. FIGS. 4(a) to 4(c) are graphs showing electrical power (FIG. 4(a)), the remaining energy (of the battery) (FIG. 4(b)), and the battery temperature (FIG. 4(c)) in the past, at the current time (one time point), and in the future of the sodium-sulphur battery of the hybrid system shown in FIG. 2 at the current time (the one time point).

A hybrid system 8 shown in FIG. 2 comprises: a wind turbine 7 (generator of renewable energy) that converts wind energy into rotation of a windmill; and a battery energy storage system 5. The battery energy storage system 5 comprises: a sodium-sulphur battery 3, as a secondary battery, which can store and output electrical power; a PCS (Power Conversion System) 4 having a DC/AC converting function; and a transformer 9. The PCS (Power Conversion System) 4 can comprise a chopper and an inverter or an inverter. Although not shown in FIG. 2, a plurality of systems of the wind turbine 7 and the battery energy storage system 5 are generally arranged.

In the hybrid system 8, the sodium-sulphur battery 3 of the battery energy storage system 5 performs discharge operation, and electrical power $P_N$ generated by the discharge operation, measured by a wattmeter 42, compensates for the change in electrical power (electrical power $P_W$ measured by a wattmeter 43) generated and output by the wind turbine 7. As a consequence, a planned and combined output (electrical power $P_T$ measured by a wattmeter 41) of the entire hybrid system 8 is $P_T=P_W+P_N$=constant ($P_N=P_T-P_W$). In other words, in order to obtain the above relation, the discharge operation (i.e., the electrical power $P_N$) of the sodium-sulphur battery 3 is controlled, the planned and combined output (the electrical power $P_T$) of the entire hybrid system 8 is stable, and the power is supplied to grid 1 between a distribution substation and a power demander.

In both the cases of charging and discharging the sodium-sulphur battery 3, in the battery energy storage system 5, a control target value (battery output) of the PCS (Power Conversion System) 4 is changed so as to input or output electrical power for compensating for an output (the electrical power $P_W$) from the wind turbine 7 based on the output, thereby charging or discharging the sodium-sulphur battery 3 and thus absorbing the change in output of the wind turbine 7. With the generator of renewable energy (the wind turbine 7) and the sodium-sulphur battery 3 (the battery energy storage system 5) that do not almost emit carbon dioxide, stable electrical power with high quality is supplied and the hybrid system 8 can be therefore a preferable power generating system.

However, since the change in output of the wind turbine 7 is generally intensive, it is not possible to manage the remaining energy of the sodium-sulphur battery 3 forming the battery energy storage system 5. Thus, the output of the wind turbine 7 is not compensated and the driving does not continue because the battery temperature becomes high, and therefore, the output of the wind turbine 7 cannot be compensated even if the remaining energy is sufficient.

Then, in a control system 10 comprising an operational guidance device 11, a monitoring device 12, and a control device 14 as shown in FIG. 1, the following control (processing) is performed. In the control system 10, (e.g.), the remaining battery capacity of the sodium-sulphur battery 3 until the current time is managed by the control device 14, the battery temperature of the sodium-sulphur battery 3 is detected, and data thereon is stored by the control device 14 (refer to FIGS. 4(b) and (c)). Further, the remaining battery capacity of the sodium-sulphur battery 3 and the battery temperature are continuously output from the control device 14 to the operational guidance device 11. Incidentally, this processing is a part of processing of the operational guidance device 11, however, is continuously performed independently of another processing, and is omitted from the flowchart shown in FIG. 3.

The operation output (refer to FIG. 4(a)) for every time zone, required by the sodium-sulphur battery 3 at a later stage (in the future), is obtained for every time zone by subtracting a predicted output (predicted electrical power $P_W$) of the wind turbine 7 from the planned and combined output (electrical power $P_T$) of the hybrid system 8. In order to obtain the operation output for every time zone, an operation manager inputs the planned and combined output of the hybrid system 8 for every time zone and the predicted output of the wind turbine 7 with the monitoring device 12, and the input values are output from the monitoring device 12 to the operational guidance device 11. Incidentally, the operation manager may directly input the operation output for every time zone necessary for the sodium-sulphur battery 3 with the monitoring device 12.

In the operational guidance device 11, the remaining battery capacity and the battery temperature of the sodium-sulphur battery 3 are predicted at the final time of the time zone on the basis of the obtained operation output and time zone (the operation output for every time zone), and it is determined whether or not the driving is possible without lowering the remaining energy below the standard value and making the battery temperature abnormal until the final time. That is, it is determined whether the battery operation is YES or NO. When it is determined the battery operation is YES, the operational guidance device 11 outputs such a fact to the monitoring device 12 (or does not output specific data). When it is determined that the battery operation is NO, i.e., when it is predicted that the remaining energy becomes below the standard value or the battery temperature exceeds the upper limit of an allowable range until the final time, the operational guidance device 11 outputs, to the monitoring device 12, guidance indicating that the planned and combined output is to be changed.

In the monitoring device 12, upon receiving the guidance indicating that the planned and combined output is to be changed from the operational guidance device 11, a new planned and combined output is set from the input of the operation manager or automatic calculation based on allowable power of the sodium-sulphur battery 3. Further, the monitoring device 12 outputs, to the control device 14, a new (lower) control target value of the battery output obtained by subtracting the predicted output of the wind turbine 7 from the set planned and combined output. Furthermore, the control device 14 changes the control target value of the battery output in the PCS (Power Conversion System) 4 (refer to FIG. 2) to a new one, and the sodium-sulphur battery 3 is operated based on the changed value, and the discharge operation with new (lower) power $P_N$ is performed.

Then, the change in operation state also enables the change in remaining battery capacity and battery temperature of the sodium-sulphur battery 3, continuously output from the control device 14 to the operational guidance device 11 (a reducing trend of the remaining battery capacity is released and an increasing inclination of the battery temperature is decreased), and the determination as whether the battery operation is YES or NO is led to the determination of YES.

When it is determined the battery operation is NO even by re-prediction with the operational guidance device 11, the value of the planned and combined output is reduced, thereby reducing the operation output for every time zone necessary for the sodium-sulphur battery 3 and leading the determination of the battery operation as YES. In this case, the planned and combined output of the hybrid system 8 is low and, however, the situation of the stop of operation can be prevented.

Next, a description will be given of processing in the operational guidance device 11 from the control system 10 with reference to FIG. 3. In FIG. 3, the planned and combined output and the predicted output will not be changed for every time zone in the future and, in place of this, the planned and combined output and the predicted output will be constant by the end time of the input, unlike the above description. The planned and combined output can be changed based on the determination result of YES or NO, and a fact that those will be constant by the end time in the example shown in FIG. 3 indicates that those will not be changed for every time zone. After changing the output, the planned and combined output having the changed value will be constant by the end time. The operational guidance device 11 mainly comprises a sequencer and an industrial computer, specifically, a main constituting unit, a main memory that stores an operation guidance program, a display device (liquid crystal screen, etc.), a timer, a keyboard that receives an input from the operation manager, a file device that records the received remaining battery capacity and battery temperature of the sodium-sulphur battery 3, and a communication interface board that inputs the data from the control device 14 and the monitoring device 12 and outputs the data to the monitoring device 12.

Although omitted from the flowchart shown in FIG. 3 as mentioned above, the remaining battery capacity and the battery temperature of the sodium-sulphur battery 3 are continuously input and are recorded to the file device. Further, although similarly omitted from the flowchart shown in FIG. 3, the standard smallest capacity and the standard highest temperature of the sodium-sulphur battery are input from the keyboard, and are recorded to the file device. Furthermore, the file device receives the planned and combined output of the hybrid system 8, the end time (as the substitute of the above-mentioned time zone) of the operation of the sodium-sulphur battery 3, and the predicted output of the wind turbine 7 are input, stored on the main memory, and records them to the file device. The changed value of the planned and combined output does not need to be initially input.

The central processing unit performs the following processing in response to a command from the operation guidance program.

(1) First of all, the predicted output is subtracted from the planned and combined output, thereby calculating the operation output (that is constant by the end time in FIG. 3) required by the sodium-sulphur battery 3, and the calculated output is stored on the main memory. Further, the current time is read from the timer, the current time is subtracted from the end time to calculate an output time required by the sodium-sulphur battery 3, and the calculated time is stored on the main memory.

(2) Next, the central processing unit calculates (predicts) the remaining battery capacity and the battery temperature of the sodium-sulphur battery 3 at the end time (corresponding to the final time in the time zone) in response to a command of a battery simulation (sub) routine of the operation guidance program, stores the calculated result on the main memory, and records it to the file device.

Figure 5:
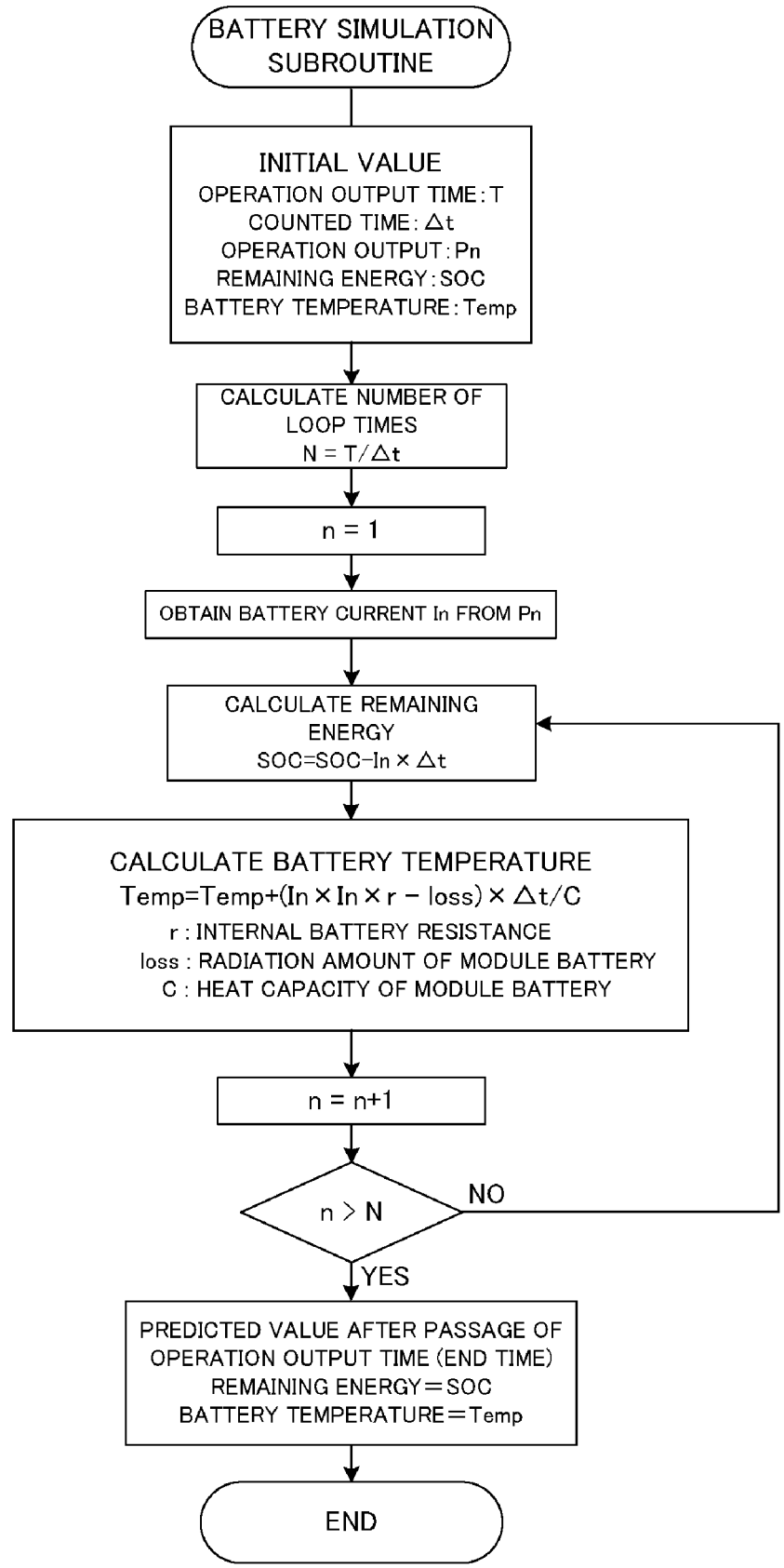
FIG. 5 is a flowchart showing an example of a processing flow of a battery simulation (sub) routine in the flowchart shown in FIG. 3.

In the battery simulation (sub) routine, the remaining battery capacity and the battery temperature of the sodium-sulphur battery 3 are calculated with processing shown in FIG. 5. Specifically, battery current is obtained from the operation output, and the remaining energy is calculated and updated on the basis of the battery current and counted time $\Delta t$. Further, the battery temperature is calculated and updated on the basis of the battery current, battery internal resistance, radiation amount of a module battery, counted time $\Delta t$, and heat capacity of the module battery. The remaining energy and the battery temperature are calculated by the number of times determined by the time of the operation output and the counted time $\Delta t$, thereby calculating the remaining battery capacity and the battery temperature of the sodium-sulphur battery 3 after the time of the operation output, i.e., the end time.

(3) Further, the standard highest temperature (e.g., 360° C.) is read from the file device to the main memory, and the read temperature is compared with the calculated battery temperature at the end time. If the battery temperature at the end time is higher than the read temperature, such a message is output (displayed) to the display device that "The temperature is over the upper limit thereof. Change the planned and combined output." Furthermore, the standard smallest capacity (e.g., 5% of a rated capacity) is read from the file device to the main memory. The read capacity is compared with the calculated remaining battery capacity at the end time. If the remaining battery capacity is smaller at the end time, such a message is displayed on the display device that "The capacity runs short. Change the planned and combined output."

(4) Next, when the determination indicates YES, i.e., when the battery temperature at the end time is not more than the standard highest temperature and the remaining battery capacity at the end time is not less than the standard smallest capacity, if a changing flag of the planned and combined output on the main memory is 1, 0 is stored to the flag and the display device displays that "The planned and combined output is changed." Here, the first-cycle processing of the operational guidance device 11 ends.

After the second cycle, in response to the indication on the display device that "Change the planned and combined output", the changed value of the planned and combined output is input from the keyboard, is stored to the main memory, and is recorded to the file device. In this case, the central processing unit stores 1 to the changing flag of the planned and combined output on the main memory in response to the command from the operation guidance program. Subsequently, the processing returns to (1) whereupon the processing similar to that of the first cycle is performed. Incidentally, the predicted output of the wind turbine 7 may be input by (1) (refer to FIG. 3).

INDUSTRIAL APPLICABILITY

It is possible to use an operational guidance device of a sodium-sulphur battery according to the present invention as means for properly operating the sodium-sulphur battery forming every battery energy storage system including a battery energy storage system used by combining a battery energy storage system for load leveling and a generator whose output is changed.

It is possible to preferably use an operational guidance device of a sodium-sulphur battery of a hybrid system according to the present invention, as means for efficiently and stably operating the sodium-sulphur battery forming a battery energy storage system without unexpected stop operation in the hybrid system for supplying power to grid by combining a generator whose output is changed and a battery energy storage system, using renewable energy such as wind energy, sunlight, and geothermal heat.

What is claimed is:

1. An operational guidance device for a sodium-sulphur battery that guides operation of the sodium-sulphur battery, comprising:

means for inputting an operation output necessary for the sodium-sulphur battery and a time zone for requiring the operation output;

means for continuously inputting a remaining battery capacity of the sodium-sulphur battery and a battery temperature of the sodium-sulphur battery;

means for predicting the remaining battery capacity of the sodium-sulphur battery and the battery temperature of the sodium-sulphur battery at the final time of the time zone on the basis of the remaining battery capacity of the sodium-sulphur battery and the battery temperature of the sodium-sulphur battery, which are continuously input, the operation output necessary for the sodium-sulphur battery, and the time zone for requiring the operation output;

means for comparing the predicted remaining battery capacity of the sodium-sulphur battery at the final time with a standard smallest capacity recorded in advance, and outputting guidance indicating a control target value of a battery output is to be changed because the capacity runs short when the remaining battery capacity is smaller than the standard smallest capacity; and means for comparing the predicted battery temperature of the sodium-sulphur battery at the final time with a standard highest temperature recorded in advance and outputting guidance indicating that a control target value of a battery output is to be changed when the battery temperature is high because the discharge operation stops when the temperature reaches an upper limit of an allowable range.

2. An operational guidance device of a sodium-sulphur battery of a hybrid system, the hybrid system that supplies power to a generator by combining a generator and a battery energy storage system, the operational guidance device and an PCS (Power Conversion System) forming the battery energy storage system, the operational guidance device that outputs guidance in operation of the sodium-sulphur battery for compensating for an output of the generator, the operational guidance device comprising:

means for inputting, for every time zone, a planned and combined output of the hybrid system and a predicted output of the generator;

means for calculating an operation output necessary for the sodium-sulphur battery for every time zone on the basis of the planned and combined output and the predicted output;

means for continuously inputting a remaining battery capacity of the sodium-sulphur battery and a battery temperature of the sodium-sulphur battery;

means for predicting the remaining battery capacity of the sodium-sulphur battery and the battery temperature of the sodium-sulphur battery at the final time of the time zone on the basis of the remaining battery capacity of the sodium-sulphur battery and the battery temperature of the sodium-sulphur battery, which are continuously input, the calculated operation output necessary for the sodium-sulphur battery, and the time zone for requiring the operation output;

means for comparing the predicted remaining battery capacity of the sodium-sulphur battery at the final time with a standard smallest capacity recorded in advance and outputting guidance indicating that the planned and combined output is to be changed because the capacity runs short when the remaining battery capacity is smaller than the standard smallest capacity; and means for comparing the predicted battery temperature of the sodium-sulphur battery at the final time with the standard highest temperature recorded in advance and outputting guidance indicating that the planned and combined output is to be changed when the battery temperature is high because the discharge operation stops when the temperature reaches an upper limit of an allowable range.

3. A non-transitory computer readable medium encoded with an operational guidance program for controlling an output of a sodium-sulphur battery, the program comprising the steps of:

inputting an operation output necessary for the sodium-sulphur battery and a time zone for requiring the operation output;

continuously inputting a remaining battery capacity of the sodium-sulphur battery and a battery temperature of the sodium-sulphur battery;

predicting the remaining battery capacity of the sodium-sulphur battery, and the battery temperature of the sodium-sulphur battery at the final time of the time zone on the basis of the remaining battery capacity of the sodium-sulphur battery and the battery temperature of the sodium-sulphur battery, which are continuously input, the operation output necessary for the sodium-sulphur battery, and the time zone for requiring the operation output;

comparing the predicted remaining battery capacity of the sodium-sulphur battery at the final time with a standard smallest capacity recorded in advance, and outputting guidance indicating that a control target value of a battery output is to be changed because the capacity runs short when the remaining battery capacity is smaller than the standard smallest capacity; and comparing the predicted battery temperature of the sodium-sulphur battery at the final time with a standard highest temperature recorded in advance, and outputting guidance indicating that a control target value of a battery output is to be changed when the battery temperature is high because the discharge operation stops when the temperature reaches an upper limit of an allowable range.

4. A control system of a sodium-sulphur battery comprising:

the operational guidance device of the sodium-sulphur battery according to claim 1;

a monitoring device comprising means for inputting guidance indicating that a control target value of a battery output from the operational guidance device is to be changed and outputs a new lower control target value of the battery output and means for outputting an operation outputs necessary for the sodium-sulphur battery and a time zone for requiring the operation output to the operational guidance device; and a control device comprising means for inputting the new control target value of the battery output from the monitoring device and controlling an output of the sodium-sulphur battery, and means for continuously outputting a remaining battery capacity of the sodium-sulphur battery and a battery temperature of the sodium-sulphur battery to the operational guidance device.

* * * * *